United States Patent [19]
Arnett

[11] Patent Number: 5,302,140
[45] Date of Patent: Apr. 12, 1994

[54] CONNECTOR WITH MOUNTING COLLAR FOR USE IN UNIVERSAL PATCH PANEL SYSTEMS

[75] Inventor: Jamie R. Arnett, Fishers, Ind.

[73] Assignee: AT&T Bell Laboratories, Murray Hill, N.J.

[21] Appl. No.: 42,346

[22] Filed: Apr. 2, 1993

[51] Int. Cl.$^5$ .................................... H01R 13/74
[52] U.S. Cl. ................................ 439/557; 439/544
[58] Field of Search ............ 439/544, 559, 562, 565, 439/567, 571, 676; 248/27.3

[56] References Cited

U.S. PATENT DOCUMENTS

| | | | |
|---|---|---|---|
| 4,027,937 | 6/1977 | Norden | 439/557 X |
| 4,536,052 | 8/1985 | Baker et al. | 439/544 |
| 4,934,785 | 6/1990 | Mathis et al. | 460/96.21 |
| 5,041,018 | 8/1991 | Arnett | 439/536 |
| 5,096,439 | 3/1992 | Arnett | 439/536 |
| 5,238,426 | 8/1993 | Arnett | 439/557 |

*Primary Examiner*—Eugene F. Desmond
*Attorney, Agent, or Firm*—Donald E. Hayes, Jr.

[57] ABSTRACT

In a preferred embodiment, a device which is capable of being mounted in an opening in a panel, and which is adapted to hold a component, comprises two parallel side portions each being made of a plastic material, each side portion including a depending portion at each end thereof. Each of two moveable arms extends between corresponding ends of said side portions and is hingedly connected thereto. Each moveable arm includes two detents projecting from an outer surface of the arm such that when forces are applied to free end portions of the arms to move the free end portions toward each other, the device is capable of being inserted into an opening in a panel until a face of the panel abuts the depending portions of the side portions whereupon the application of forces is discontinued to allow the arms to move outwardly and cause the detents of each arm to snap-lock into engagement with an opposite side of the panel. Furthermore, the present invention additionally includes means which allows the patch panel to adequately support the component in a position which provides ready frontal access to all wiring associated with any single component.

20 Claims, 3 Drawing Sheets

CONNECTOR WITH MOUNTING COLLAR FOR USE IN UNIVERSAL PATCH PANEL SYSTEMS

TECHNICAL FIELD

This invention relates to a connector with mounting collar for use in universal patch panel systems. More particularly, the invention relates to a connector which is connectable to a patch panel and which further includes a mounting collar which allows the connector to be fully supported by the panel while allowing complete frontal access to the connector wiring.

BACKGROUND OF THE INVENTION

In closets in buildings, connections between transmission media are made through connectors mounted on patch panels. Typically, a patch panel includes a plate having an array of openings therein. A connector is mounted in each of the openings. Connectors which are used include optical fiber connectors, coaxial connectors and copper modular connectors.

Arrangements for releasably holding connectors in a panel plate have been disclosed in the prior art. In U.S. Pat. No. 5,096,439 which issued on Mar. 17, 1992 in the name of J. R. Arnett is disclosed a plate having an opening therein. A rear side of the wall plate includes a collar for engaging the connector and holding it together with the wall plate. A connector such as a jack to be received in the opening in the wall plate includes a cavity for receiving a plug and a latching system formed along each of opposed sidewalls thereof. The latching system includes two collinear spaced stop members and a flexible member which includes a wedge-shaped tab. A tool is provided for insertion into the grooves to depress the wedge-shaped tabs when it is desired to withdraw the connector from the wall plate. See also U. S. Pat. No. 5,041,018 which issued on Aug. 20, 1991 in the name of Jamie R. Arnett.

Copending and commonly assigned Ser. No. 07/897,207 filed on Jun. 11, 1992 in the name of J. R. Arnett, discloses an additional patch panel system. Specifically, the disclosed panel system may accept any of several different kinds of connectors. Furthermore, this particular panel system allows connections to be made form the front of the panel as opposed to requiring that crafts persons work at the rear of the panel. As disclosed in the application referenced immediately above, by being able to remove the connector from the front side of the panel, a technician may install and/or maintain each individual connector without having to remove the entire panel which may disturb other connectors.

However, each of the existing panel systems and associated connectors provide the capability of housing the connector fully engaged in or fully disengaged from the patch panel. Therefore, any time the crafts person desires to remove a single connector from the front of the panel to gain access to the associated wiring, the maintenance work must either be performed with the connector dangling free and unsupported or the operator must manually provide the necessary physical support. Such requirements may drastically decrease the effectiveness and efficiency with which the maintenance work is completed. Among other concerns, the operator manually supports the connector he is with subjecting himself to an increase choice of bodily harm as well as minimizing the probability that the work is appropriately performed.

Therefore, what is sought after and seemingly not available in the prior art is a patch panel and connector arrangement wherein an individual connector can be supported by the patch panel while also providing full fronted access to the single connector.

SUMMARY OF THE INVENTION

The foregoing problems of the prior art patch panel systems have been overcome by the patch panel system of this invention. In a preferred embodiment, a device which is capable of being mounted in an opening in a panel, and which is adapted to hold a component, comprises two parallel side portions each being made of a plastic material, each side portion including a depending portion at each end thereof. Each of two moveable arms extends between corresponding ends of said side portions and is hingedly connected thereto. Each moveable arm includes two detents projecting from an outer surface of the arm such that when forces are applied to free end portions of the arms to move the free end portions toward each other, the device is capable of being inserted into an opening in a panel until a face of the panel abuts the depending portions of the side portions whereupon the application of forces is discontinued to allow the arms to move outwardly and cause the detents of each arm to snap-lock into engagement with an opposite side of the panel. Furthermore, the present invention additionally includes means which allows the patch panel to adequately support the component in a position which provides ready frontal access to all wiring associated with any single component.

BRIEF DESCRIPTION OF THE DRAWING

Other features of the present invention will be more readily understood from the following detailed description of specific embodiments thereof when read in conjunction with the accompanying drawings, in which.

DETAILED DESCRIPTION

Figure 1:
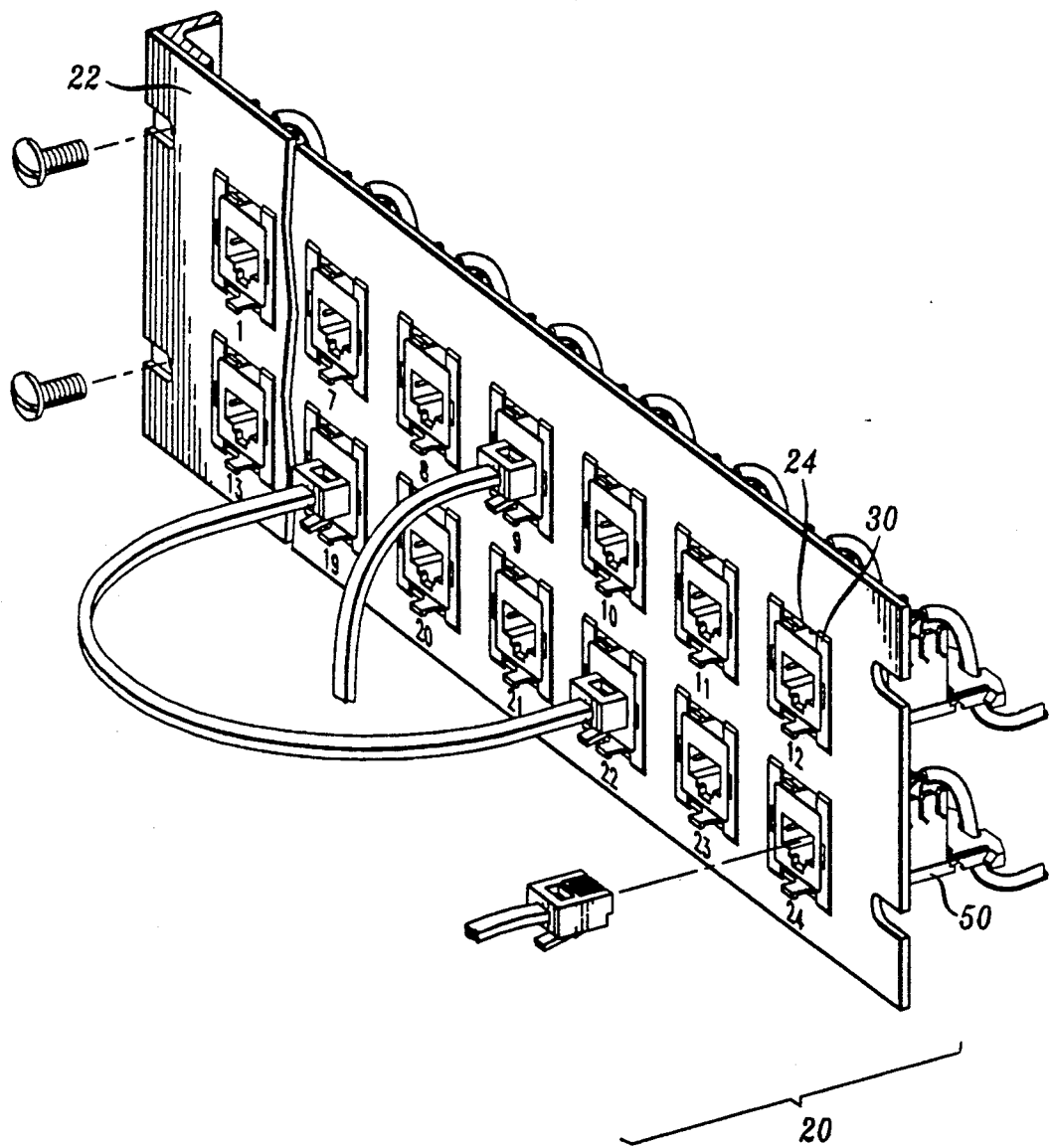
FIG. 1 is a perspective view of a patch panel system of this invention.

Referring now to FIG. 1, there is shown a patch panel system which is designated generally by the numeral 20. The patch panel system includes a panel plate 22 having a plurality of openings 24—24 formed therein. The patch panel is adapted to be supported so that the plane of the plate is oriented vertically. In each of the openings 24—24 is disposed an adapter, designated generally by the numeral 30 (see also FIG. 2).

Figure 2:
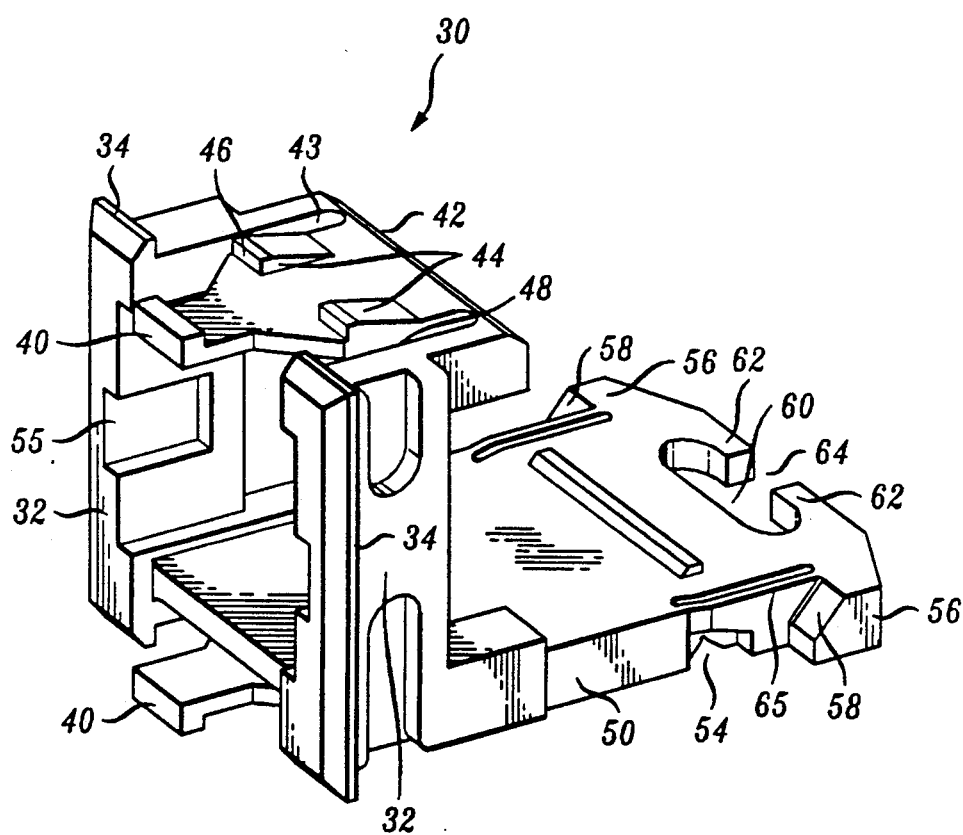
FIG. 2 is a perspective view of an adapter in accordance with the present invention.
Figure 3:
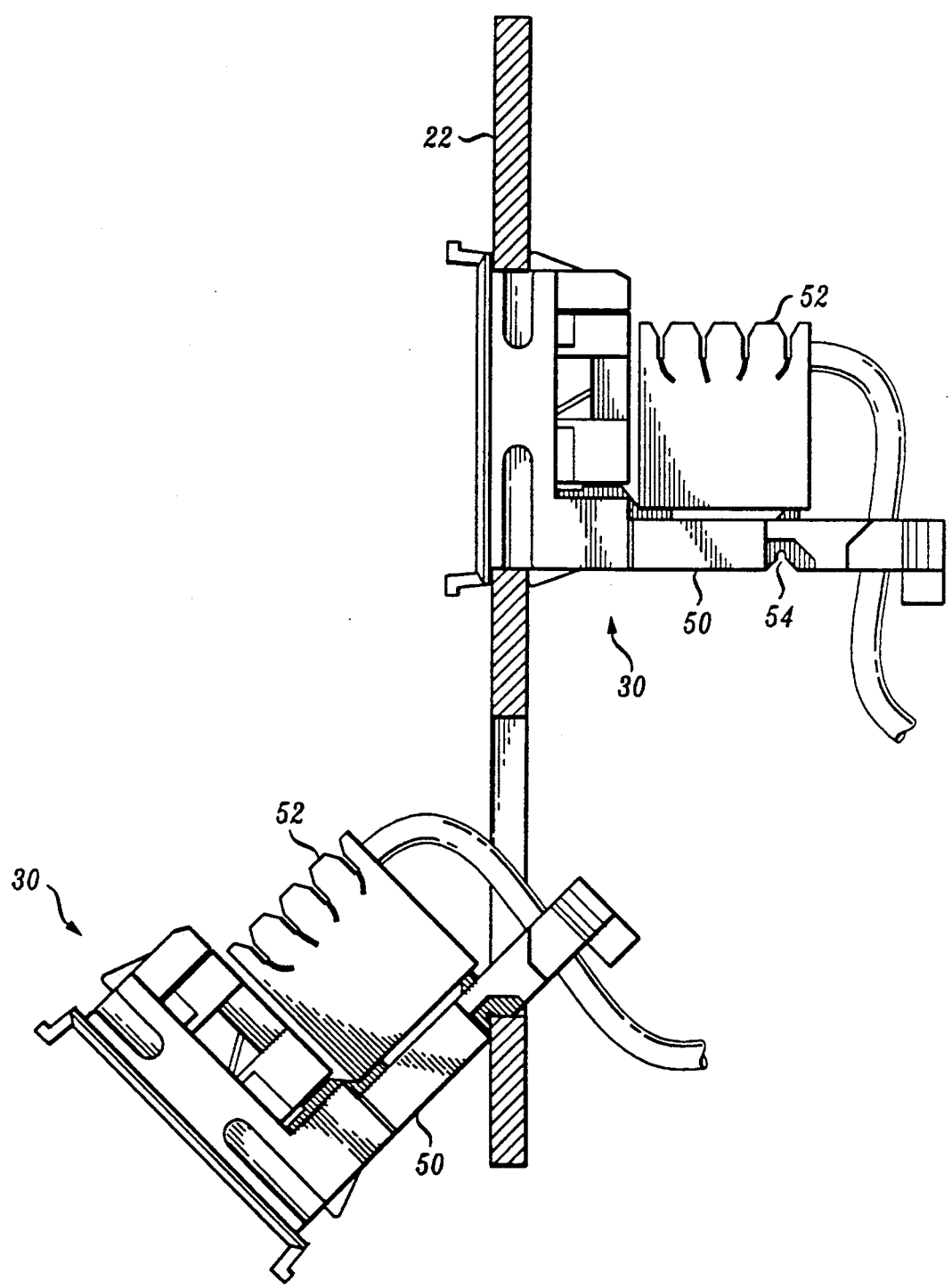
FIG. 3 is a side view of a portion of a panel plate, and two adapters disposed in openings in the panel plate depicting two positions in which the adapter and connector of the present invention may be fully supported by the panel.

The adapter 30 is such that it may be secured to the plate 22 after the adapter has been inserted into the opening. As is seen in FIGS. 2 and 3, the adapter includes two parallel side portions 32—32 each being made of a plastic material. Further, each side portion includes a depending portion 34 at each end thereof.

Two moveable portions such as arms 40—40 are provided. Also, the adapter 30 may be provided with one fixed arm and one moveable arm. Each arm 40 extends between and connected through plastic hinges 42—42 to corresponding ends of the side portions. Each moveable portion 40 includes two detents 44—44 which are spaced apart on an outer surface thereof. Each detent is wedge-shaped and includes a panel-engaging surface 46. Slots 48—48 are provided between each moveable portion 40 and the sidewalls. The detents 44—44 are formed so that the distance between the surface 46 of the detent and an associated depending portion 34 as measured in a direction parallel to the slots 48—48 is slightly greater than the thickness of the panel plate 22.

The present invention additionally provides a base portion 50 which extends from the lower portion of adapter 30. One of the provisions of the base extension portion 50 of this invention is a means for securing the adapter 30 to the panel plate 22 in an angled orientation from the front of plate 22 so as to provide ready access to a connector 52 supported by that adapter 30.

As shown in the top half of FIG. 3, when the adapter 30 is positioned for operation within plate panel 22, the base extension portion 50 merely extends through opening 24 and supports connector 52 behind plate panel 22. However, as shown in the bottom half of FIG. 3, the features of the base extension portion 50 of the present invention allows the adapter 30 to in essence hang from the front of plate 22.

In particular, the preferred embodiment provides two sections located near the back of the base extension portion 50 which act together to secure the adapter 30 while it extends outwardly from the front of panel plate 22. Together these sections establish a plurality of support points along extension 50 which enable the adapter 30 to be securably attached from the front of panel plate 22.

The first of these sections is a notch or V-shaped groove 54 which traverses the bottom portion of the base extension 50 along its width. The second section involves two winged portions 56—56 which are wider than extension portion 50 and located at the back end thereof.

In order to allow insertion of the adapter 30 through opening 24, adapter 30 must be oriented diagonally relative to opening 24 since winged portions 56—56 are wider than the width of opening 24. Once the winged portions 56—56 have passed through opening 24, the adapter 30 may be reoriented so that the front of adapter 30 is parallel to the panel plate 22. The adapter 30 may then be secured to the panel plate 22 via detents 44—44 as controlled by moveable arms 40—40 in accordance with the operation described above.

To provide ready access to the connector 52 through the front of panel 22, the adapter 30 may be pulled forward through opening 24 while maintaining its parallel orientation to the plate 22. Due to the larger size, the winged portions 56—56 prohibit the adapter 30 from passing through opening 24. As the winged portions 56—56 abut the back of panel plate 22 the V-shaped groove 54 is aligned directly above, and parallel to, the front edge of the bottom of opening 24. The front of adapter 30 may then be angled downward to provide more convenient access to the top of connector 52. As the adapter 30 is tilted downward each of the two surfaces which create V-shaped groove 54 flushly abut both the bottom of opening 24 and the front portion of panel 22 immediately below opening 24. Simultaneously, two tapered upper portions 58—58 of winged portions 56—56 are manipulated into contact with the back of panel plate 22 on both the left and right sides of opening 24.

Once tilted fully downward, the adapter 30 is prohibited from being pulled out of opening 24 by the tapered surfaces 58—58 of winged portions 56—56 due to their force against the back of panel plate 22. Similarly, the adapter 30 is prohibited from undesired downward or backward movement by the position of V-shaped groove 54 along the lower front edge of opening 24. Adjacent to winged portions 56—56 are two deformable members 65—65. The width of base extension 50 at member 65—65 is slightly larger than the width of opening 24 thereby additionally securing the connector in position.

One other feature provided by the back extension portion 50 of the present invention is a cable management portion 60 which is located in the center back portion of the base extension 50 between winged portions 56—56. The cable management portion 60 includes two tabs 62—62 which establish a space 64 therebetween as a means for introducing a cable into a holding or center portion of cable management portion 60. It should be noted that even though the embodiment illustrated has tabs 62—62 horizontally aligned, various alignments of these tabs which provide a space 64 capable of accepting a cable are deemed to be acceptable configurations within the scope of the present invention. For example, tabs 62—62 may be vertically aligned relative to each other.

The cable management portion 60 acts to prohibit a connector 52 from being exposed to external forces which may be applied to a cable attached thereto. By reducing the potential of forces being applied to the connector 52, the integrity of the electrical connections made is preserved.

In FIG. 3 is shown a cross-sectional view of a portion of the panel plate 22 to show an adapter 30 seated in an opening 24 of the panel plate as well as another adapter 30 secured to the panel 22 in a manner which provides frontal access to the associated connector. As described above, the adapter 30 is tilted and the winged portions 56—56 are moved through the opening 24, then the adapter 30 is returned to a position square relative to opening 24. Once squarely aligned, continued insertion of the adapter causes the top and bottom surfaces of the opening 24 to ride along the wedge-shaped detents 44—44. This causes forces to be applied to the detents 44—44 and hence the moveable arms 40—40 to be cammed inwardly toward each other. The inward movement of the adapter 30 continues until an outer front face of the panel plate engages the depending portions 34—34. When this engagement occurs, the surfaces 46—46 of the detents have just cleared the panel plate 22 and the resiliency of the moveable arms 40—40 allows the arms to spring-return to their initial position before insertion. This causes the detents 44—44 to snap-lock behind the panel plate and to cooperate with the depending portions 34—34 to secure the adapter within the panel plate 22.

As should be apparent, when it is desired to remove the adapter 30 from the panel plate 22, a craftsperson applies forces to the free end portions of the cantilever arms 40—40 to move the arms toward each other. Such movement is carried out to disengage the detents 44—44 from the rear surface of the panel plate 22 and permit withdrawal of the adapter from the front of the panel plate.

In order to mount a connector in the patch panel, a craftsperson pulls the connector, for example the connector 52, through the opening 24 in which it is desired to mount it and assembles the connector to an adapter 30 as described hereinabove. Then the craftsperson moves the assembly of the connector and the adapter rearwardly into the opening 24. As the adapter 30 is moved into the opening, the top and bottom surfaces of opening 24 are effective to cam the detents 44—44 and arms 40—40 inwardly. Movement of the connector 52 and the adapter 30, as an attached unit, is continued until the depending portions 34—34 engage the panel plate 22. At that time, the surfaces 46—46 clear the panel plate allowing the arms to move resiliently outwardly from each other. The detents 44—44 cooperate with the depending portions 34—34 to secure the adapter and hence the connector to the panel plate. Of course, the craftsperson could depress the arms 40—40 during the insertion process as the means to cam detents 44—44 inwardly, but this is not necessary.

In an alternative manner of mounting connectors in the panel plate 22, a craftsperson may insert an adapter 30 into each opening 24 and cause the adapters to be secured to the panel plate. Then a connector is caused to be mounted in each selected adapter.

It should be observed that after a connector has been assembled to an adapter, movement of the arms 40—40 inwardly toward each other is restricted. This prevents excess movement and possible overstressing of the arms.

Should it become desirable or necessary to rearrange connectors, a craftsperson depresses the arms 40—40 of the adapter in which the connector to be moved is mounted and moves the adapter forward out of the opening in the panel plate. During the demounting of the adapter from the panel plate, the connector such as the connector 52, for example, is still secured to the adapter. Then the craftsperson disassembles the connector from the adapter and moves it rearwardly through the opening and then laterally to the new desired location whereat it is brought forward through the opening at the new location and secured to an adapter after which the adapter is mounted in the panel plate at the new desired location.

In another method of removing connectors from the patch panel, a craftsperson may remove the connector from the rear of the panel plate, leaving the associated adapter mounted in the panel plate. Of course, it seems more advantageous to work on connections from the front of the panel plate, particularly if it is desired to perform work only on one connector.

The removal of a connector 52 from an adapter 30 is facilitated by a tool such as the one described in U.S. Pat. No. 5,096,439 which is incorporated by reference herein.

In order to prevent dust from the portion of a room in front of the panel plate from entering the opening of the adapter 30 and moving into contact with adjacent connections at the rear of the connector, a dust cover (not shown) is assembled to the adapter. The dust cover which also is disclosed in U.S. Pat. No. 5,096,439, includes side legs which are received in grooves 55—55 of the adapter.

Of course, it should be realized that other kinds of arrangements may be used to secure a connector to the adapter. What is important is that each connector to be used with an adapter has facilities which cooperate with portions of the adapter to cause the connector to be secured releasably to the adapter.

The adapter 30 may have any one of plurality of collars mounted therein. Each collar is designed to be associated with a particular connector. Therefore when it is desired to present a particular connector in a panel plate, a collar associated with that connector is inserted into the adapter and the connector is assembled to the collar.

A connector which includes a modular jack with split beam contacts, causing electrical connections to be made with the jack wires has been described earlier herein. Collars must be available for use with cylindrically shaped connectors such as coaxial connectors and AT&T's ST ® connector. See U.S. Pat. No. 4,934,785 which issued on Jun. 19, 1990 in the names of T. D. Mathis and C. M. Miller.

The collars should be removable separately from the adapter 30 or it may be separated together with the adapter 30 from the panel plate. In order to disassemble the collar from the adapter, a craftsperson causes forces to be applied to the release members and toward each other.

It is to be understood that the above-described arrangements are simply illustrative of the invention. Other arrangements may be devised by those skilled in the art which will embody the principles of the invention and fall within the spirit and scope thereof.

I claim:

1. A device which is capable of being mounted in an opening in a panel, and which is adapted to hold a component, said device comprising:
   a plurality of detents configured to allow quick connection and disconnection within the opening of the panel; and
   a base extension portion which secures the device from the front of the panel in an angled orientation which provides ready frontal access to the component held by that device.

2. The device of claim 1, wherein the base extension portion comprises a plurality of winged portions which extend from opposite sides of the base extension portion thereby increasing the width of a section of the base portion so that when the device is secured from the front of the panel by the base extension portion, the winged portions abut the back side of the panel.

3. The device of claim 1, wherein the base extension portion comprises an indention which traverses the bottom portion of the base extension along its width so that when the device is secured from the front of the panel by the base extension portion, the lower side of the panel opening seats into the nadir of the indention.

4. The device of claim 1, wherein said device further comprises
   two parallel side portions each being made of a plastic material, each side portion including a depending portion at each end thereof; and
   two moveable portions, each extending between corresponding ends of said side portions and hingedly connected thereto and each being biased resiliently outwardly, each moveable portion including two detents projecting from an outer surface of said moveable portion such that when forces are caused to be applied to free end portions of said moveable portions to cause the free end portions to be moved toward each other, the device is capable of being inserted into an opening in a panel until a front surface of the panel abuts the depending portions of the side portions whereupon the application of forces is discontinued to allow the moveable portions to move outwardly and cause said detents to snap-lock into engagement with an opposite surface of the panel.

5. The device of claim 4, wherein each of said detents is wedge-shaped with the portion thereof having the least thickness being oriented toward that portion of the device which is first inserted into the opening in the panel.

6. The device of claim 4, wherein both said moveable portions are biased outwardly to cause said detents to abut opposed surfaces which define the opening into which the device is inserted.

7. The device of claim 4, wherein when the front surface of said panel engages said depending portions and when said device is fully inserted, the discontinuation of the application of forces to said moveable portions allows said moveable portions to move outwardly and cause end faces of said detents, which end faces are adjacent to the depending portions of the side portions, to engage an opposite surface of said panel.

8. A patch panel which comprises:
a panel plate having an array of openings formed therein; and
an adapter which is mounted in an opening in a panel plate, and which is adapted to hold a component, said device comprising:
a plurality of detents configured to allow quick connection and disconnection within the opening of the panel; and
a base extension portion which secures the device from the front of the panel in an angled orientation which provides ready frontal access to the component held by that device.

9. The patch panel of claim 8, wherein the base extension portion comprises a plurality of winged portions which extend from opposite sides of the base extension portion thereby increasing the width of a section of the base portion so that when the device is secured from the front of the panel by the base extension portion, the winged portions abut the back side of the panel.

10. The patch panel of claim 8, wherein the base extension portion comprises an indention which traverses the bottom portion of the base extension along its width so that when the device is secured from the front of the panel by the base extension portion, the lower side of the panel opening seats into the nadir of the indention.

11. The patch panel of claim 8, wherein said device further comprises
two parallel side portions each being made of a plastic material, each side portion including a depending portion at each end thereof; and
two moveable arm portions, each extending between corresponding ends of said side portions and hingedly connected thereto and each being biased resiliently outwardly, each moveable arm portion including two detents projecting from an outer surface of said moveable arm portion such that when forces are caused to be applied to free end portions of said moveable arm portions to cause the free end portions to be moved toward each other, the adapter is capable of being inserted into an opening in said panel plate until a front surface of the panel plate abuts the depending portions of the side portions whereupon the application of forces is discontinued to allow the moveable arm portions to move outwardly and cause said detents to snap-lock into engagement with an opposite surface of the panel plate to hold said adapter mounted within the opening in the panel plate.

12. The patch panel of claim 8, wherein each of said detents is wedge-shaped with the portion thereof having the least thickness being oriented toward that portion of the adapter which is first inserted into the opening in the panel plate.

13. The patch panel of claim 9, wherein said moveable arm portions are biased outwardly sufficiently to require their relative movement toward each other to withdraw said adapter from said panel plate.

14. The patch panel of claim 10, wherein when said front surface of said panel plate engages said depending portions when said device is fully inserted, the discontinuation of the application of forces to said moveable arm portions allows said moveable arm portions to move outwardly and cause end faces of said detents to engage an opposite surface of said panel plate.

15. The patch panel of claim 11, wherein each of said side portions includes an inwardly facing surface which is provided with a groove which extends from a front end portion of said device toward an opposite end portion of said side portion, a modular jack which is adapted to become disposed in an opening formed by said side portions and said moveable portions being provided with depressible detents on opposite sides of the modular jack, each of the detents having associated therewith two spaced, collinear projections so that when the modular jack is inserted into the opening in said adapter, the detents are depressed toward each other and ride over bridge portions of said side portions until the projections abut an outer surface of said side portion whereupon each depressible detent is aligned with the groove on the associated side portion and is biased outwardly to cause the detents to snap-lock into said grooves of said side portions.

16. The patch panel of claim 12, wherein said moveable arm portions are sufficiently moveable toward each other to disengage said detents from the panel plate to allow withdrawal of said adapter from the opening in the panel.

17. The patch panel of claim 12, wherein the distance between a plane which extends through inner surfaces of the depending portions which engage the panel plate and a plane through those end faces of the wedge-shaped detents which are adjacent to the inner surfaces of the depending portions of the side portions is slightly greater than the thickness of the panel plate.

18. The patch panel of claim 17, which also includes at least one connector which is secured to one of said adapters, said connector including a latching system provided on each of opposed sides thereof, said latching system comprising two spaced colinear tabs adapted to engage a rear portion of said side portion of said adapter and a resilient latching finger which is adapted to snap-lock into an associated groove of said adapter to secure said connector to said adapter.

19. The patch panel of claim 8, which also includes a collar which is capable of being assembled to said adapter and which is capable of having a tubular connector assembled thereto, said collar including a front wall and top and bottom walls extending perpendicularly from said front wall and two sidewalls extended inwardly from said front wall, said front wall including an opening for receiving an optical fiber connector, each said sidewall including means for causing said collar to be secured to said adapter.

20. The patch panel of claim 19, wherein each said sidewall includes side portions each having a depending portion and a center portion, said center portion having a wedge-shaped detent and a release member projecting from an outer surface thereof, the depending portions and the wedge-shaped detents being effective to cause said collar to become secured to said adapter.

* * * * *